US004001695B2

United States Statutory Invention Registration [19]

[11] Reg. Number: H1695

Rathke et al.

[45] Published: Nov. 4, 1997

[54] METHOD OF SOLUBILIZING PHTHALOCYANINES AND METALLOPHTHALOCYANINES

[75] Inventors: Jerome W. Rathke, Bolingbrook; Michael J. Chen, Darien; Carol M. Fendrick, Downers Grove, all of Ill.

[73] Assignee: The United States of America as represented by the United States Department of Energy, Washington, D.C.

[21] Appl. No.: 531,733

[22] Filed: Jun. 1, 1990

[51] Int. Cl.[6] ..... C09B 47/04

[52] U.S. Cl. ..... 540/128; 430/78

[58] Field of Search ..... 540/128; 430/78

[56] References Cited

U.S. PATENT DOCUMENTS 3,759,947 9/1973 Pugin et al. ..... 540/128

OTHER PUBLICATIONS

Hanack et al, Chemische Pepichte, 115, 2836–2853 (1982).
Hopff et al Helv. Chim. Acta. 51(2) 253–60 Chem. Abstracts vol. 68, 1968. Abstract 106060p.
Chen, et al J. Chem. Soc. Perkin Trans. 1, 1989 (5) 1071–3 Chem. Abstracts vol. 111, 1989 Abstract 232758s.
Metz et al., "Synthesis and Properties of Substituted (Phthalocyaninato)iron and –cobalt Compounds", Inorg. Chem., 1984, 23, p. 1065.
Snow et al., "Molecular Association and Monolayer Formation of Soluble Phthalocyanine Compounds", J. Am. Chem. Soc., 1984, 106, pp. 4706–4711.
Koray et al., "Preparation of a Novel Soluble Copper Phthalocyanine with Crown Ether Moieties", J. Chem. Soc., Chem. Commun., 1986, pp. 932–933.
Kobayashi et al., "A Copper Phthalocyanine with Four Crown Ether Voids", J. Chem. Soc., Chem. Commun., 1986, pp. 1462–1463.
Leznoff et al., "The Synthesis of Mono–and Disubstituted Phthalocyanines Using a Dithioimide", Can. J. Chem., vol. 65, 1987, pp. 1705–1713.
Cook et al., "1,4,8,11,15,18,22,25–Octa–alkyl Phthalocyanines: New Discotic Liquid Crystal Materials", J. Chem. Soc., Chem. Commun., 1987, pp. 1086–1088.
Krizan and Martin, "In Situ Trapping of Ortho–Lithiated Benzenes Containing Electrophilic Directing Groups[1]", J. Am. Chem. Soc., 1983, 105, pp. 6155–6157.

*Primary Examiner*—Robert L. Stoll
*Assistant Examiner*—Joseph D. Anthony
*Attorney, Agent, or Firm*—James W. Weinberger; Thomas G. Anderson; William R. Moser

[57] ABSTRACT

A one-step method of manufacturing soluble phthalocyanines and metallophthalocyanines, like zinc phthalocyanine, by converting a phthalocyanine or a metallophthalocyanine to a trialkylsilyl-substituted derivative is disclosed. The phthalocyanine or metallophthalocyanine is converted to a soluble trialkylsilyl-substituted derivative by interacting the phthalocyanine or metallophthalocyanine with an active metal amide, like lithium 2,2,6,6-tetramethylpiperidide, and a halotrialkylsilane, like chlorotrimethylsilane, to provide a phthalocyanine compound, like phthalocyanine monomers, dimers or polymers, metalated or unmetalated, that are soluble in organic media.

2 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF SOLUBILIZING PHTHALOCYANINES AND METALLOPHTHALOCYANINES

CONTRACTUAL ORIGIN OF THE INVENTION

The United States Government has rights in this invention pursuant to Contract No. W-31-109-ENG-38 between the U.S. Department of Energy and University of Chicago.

FIELD OF THE INVENTION

The present invention relates to phthalocyanines and metallophthalocyanines, and a method of manufacturing phthalocyanines and metallophthalocyanines that are soluble in organic solvents. More particularly, the present invention relates to a one-step method of manufacturing phthalocyanine compounds, like phthalocyanine monomers, dimers and polymers, or their metal complexes, that are soluble in organic solvents by interacting a phthalocyanine compound or a metallophthalocyanine compound with an active metal amide, like a lithium amide, such as lithium 2,2,6,6-tetramethylpiperidide, and a halotrialkylsilane, like chlorotrimethylsilane, to provide a soluble trimethylsilyl-substituted phthalocyanine compound or a soluble trimethylsilyl substituted metallophthalocyanine compound. Accordingly, the method of the present invention is an improved, one-step process to provide phthalocyanines and metallophthalocyanines that are soluble in organic media.

BACKGROUND OF THE INVENTION AND PRIOR ART

Phthalocyanines and metallophthalocyanines have well-known uses as dyes and pigments. For example, the use of phthalocyanines as blue and as green pigments has several important industrial applications. Phthalocyanines and the metalated derivatives also are used in electrocatalysis, photovoltaics, photocatalysis, molecular metals, photoconductivity, chemical sensors, batteries and similar applications.

Furthermore, it is known that a metallophthalocyanine, like zinc phthalocyanine, is an efficient catalyst for a variety of reactions, even at the low solubility generally demonstrated by the metallophthalocyanines, like about $10^{-5}$ M (moles/liter). For example, even at the low concentration of about $10^{-5}$ M, zinc phthalocyanine catalyzes the disproportionation of trimethylsilyl formate and the addition of carbon dioxide to metal hydrides.

In general, investigators expect that the catalytic chemistry of the phthalocyanines should parallel the catalytic chemistry of the porphyrins in enzymes and enzyme model systems. In addition, the phthalocyanines are more stable than the porphyrins, and therefore, as an added advantage, the phthalocyanines and metallophthalocyanines can catalyze reactions at high temperatures and pressures that destroy the porphyrins. For example, unlike the porphyrins, zinc phthalocyanine is not measurably decomposed when heated at about 250° C. under high pressures, like 350 atm., for two weeks in the presence of hydrogen gas and carbon monoxide gas. Under identical conditions, zinc tetraphenylporphyrin decomposed extensively within one hour. Therefore, because of the stability of the phthalocyanines and metallophthalocyanines, and because of their demonstrated catalytic ability, phthalocyanines and metallophthalocyanines are considered ideal candidates for use as homogeneous catalysts in reactions requiring high temperatures and pressures.

However, the phthalocyanines and metallophthalocyanines are notoriously insoluble in organic media, thereby limiting their usefulness as homogeneous catalysts. Similarly, the low solubility of phthalocyanines and metallophthalocyanines in organic media has limited the use of these compounds in other industrial applications. Therefore, investigators have sought ways to solubilize phthalocyanines and metalated phthalocyanines by introducing suitable substituents onto the basic phthalocyanine structure to increase the solubility of the phthalocyanine, or by introducing structural features into the phthalocyanine that may be useful in designing shape-selective or size-selective catalysts.

The basic structure of a phthalocyanine is depicted in structural formula (I), wherein the numerals 1 to 25 illustrate the numbering system for the carbon atoms of phthalocyanine and the numerals 29 and 31 illustrate the numbering system for the internal nitrogen atoms of phthalocyanine.

(I)

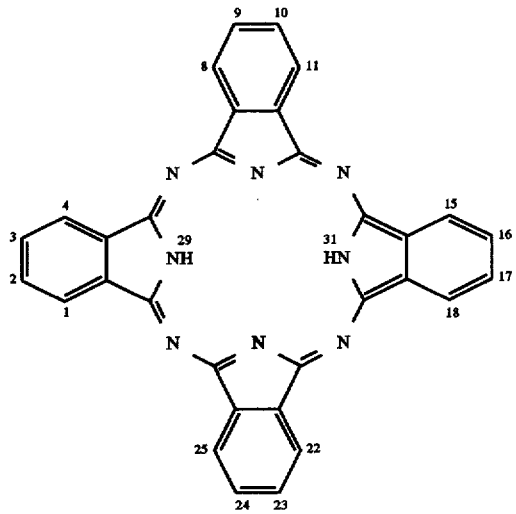

The low solubility of compound (I), its derivatives and metalated analogs in organic media is a well-known physical property of phthalocyanines. This low solubility has inhibited the development of solution chemistry applications for phthalocyanine compounds. Accordingly, efforts have been directed to increasing the solubility of these compounds by synthesizing phthalocyanine derivatives having substituents positioned on the carbon atoms at positions numbered 2, 3, 9, 10, 16, 17, 23 and 24, termed here and hereinafter as the peripheral carbon positions. Such peripherally-substituted phthalocyanine derivatives are disclosed in the following publications:

1.) J. Metz, et al., *Inorg. Chem.*, 23, p. 1065 (1984);

2.) A. W. Snow, et al., *J. Am. Chem. Soc.*, 106, p. 4706 (1984);

3.) A. R. Koray, et al., *J. Chem. Soc., Chem. Commun., p.* 932 (1986);

4.) N. Kobayashi, et al., *J. Chem. Soc., Chem. Commun., p.* 1462 (1986); and

5.) C. C. Leznoff, et al., *Can. J. Chem.*, 65, p. 1705 (1987).

Another publication, by M. J. Cook, et al., in *J. Chem. Soc., Chem. Commun., p.* 1086 (1987), described substituted phthalocyanine compounds substituted with eight alkyl groups on the carbon atoms at positions 1, 4, 8, 11, 15, 18, 22 and 25, termed here and hereinafter the nonperipheral carbon positions. However, in each of the above-cited references, the substituted phthalocyanines were prepared by the condensation of phthalocyanine precursors, such as the condensation of phthalonitriles and phthalimides, in a synthetic scheme that was laborious and time-consuming. In contrast, the present invention is directed to a one-step preparation of a highly-soluble phthalocyanine or metalated phthalocyanine substituted at one or more of the nonperipheral carbon atoms of phthalocyanine.

Therefore, in contrast to the prior art methods, soluble phthalocyanines and metallophthalocyanines are prepared in a one-step process wherein a metalated phthalocyanine, like a lithiated phthalocyanine, is trapped in situ by a halotrialkylsilane to produce a soluble phthalocyanine substituted at one or more of the non-peripheral 1, 4, 8, 11, 15, 18, 22 and 25 carbon positions with a trialkylsilyl moiety. The soluble phthalocyanines of the present invention are depicted by the general formula, $H_2Pc(SiR_3)_x$, and the soluble metallophthalocyanines of the present invention are depicted by the general formula, $MPc(SiR_3)_x$, wherein H is a hydrogen atom present at position 29 or 31 of phthalocyanine depicted in structural formula (I); M is a metal ion, like zinc, present in a metalated phthalocyanine of structural formula (I) at positions 29 and/or 31; Pc is the phthalocyanine structure depicted in formula (I); R is an alkyl group including from one to about four carbon atoms; and x is a numeral ranging from 1 to 4.

SUMMARY OF THE INVENTION

The present invention is directed to phthalocyanines and metallophthalocyanines substituted at one or more of the nonperipheral 1, 4, 8, 11, 15, 18, 22 and 25 carbon positions with trialkylsilyl moieties, and that exhibit increased solubility in organic media. The soluble phthalocyanines and metallophthalocyanines are prepared in a novel one-step process by interacting the phthalocyanine or metallophthalocyanine with a suitable active metal amide, preferably a lithium amide, to form a lithiated phthalocyanine, then trapping the lithiated phthalocyanine in situ with a halotrialkylsilane to form a trialkylsilyl-substituted phthalocyanine that is soluble in most-organic media. More particularly, the present invention is directed to soluble phthalocyanines and their method of manufacture, such as a phthalocyanine substituted with from one to about four trialkylsilyl moieties, like a trimethylsilyl moiety, at the nonperipheral carbon atoms, by interacting the phthalocyanine with a suitable active metal amide, like lithium 2,2,6,6-tetramethylpiperidide, and a halotrialkylsilane, like chlorotrimethylsilane.

Therefore, it is an object of the present invention to provide a phthalocyanine and/or metalated phthalocyanine that is soluble in organic media.

Another object of the present invention is to provide a method of preparing a phthalocyanine or a metallophthalocyanine that is soluble in organic media, comprising interacting the phthalocyanine or metallophthalocyanine with a suitable active metal amide in the presence of a halotrialkylsilane.

Another object of the present invention is to provide a soluble phthalocyanine or a soluble metallophthalocyanine substituted with from one to about four trialkylsilyl moieties at the nonperipheral 1, 4, 8, 11, 15, 18, 22 or 25 carbon positions of the phthalocyanine structure.

BRIEF DESCRIPTION OF THE DRAWINGS

The above and other objects and advantages and novel features of the present invention will become apparent from the following detailed description of the invention illustrated in the accompanying figures, demonstrating the soluble phthalocyanines and metallophthalocyanines of the present invention, and their method of manufacture, wherein.

DETAILED DISCLOSURE OF THE INVENTION

Figure 1A:
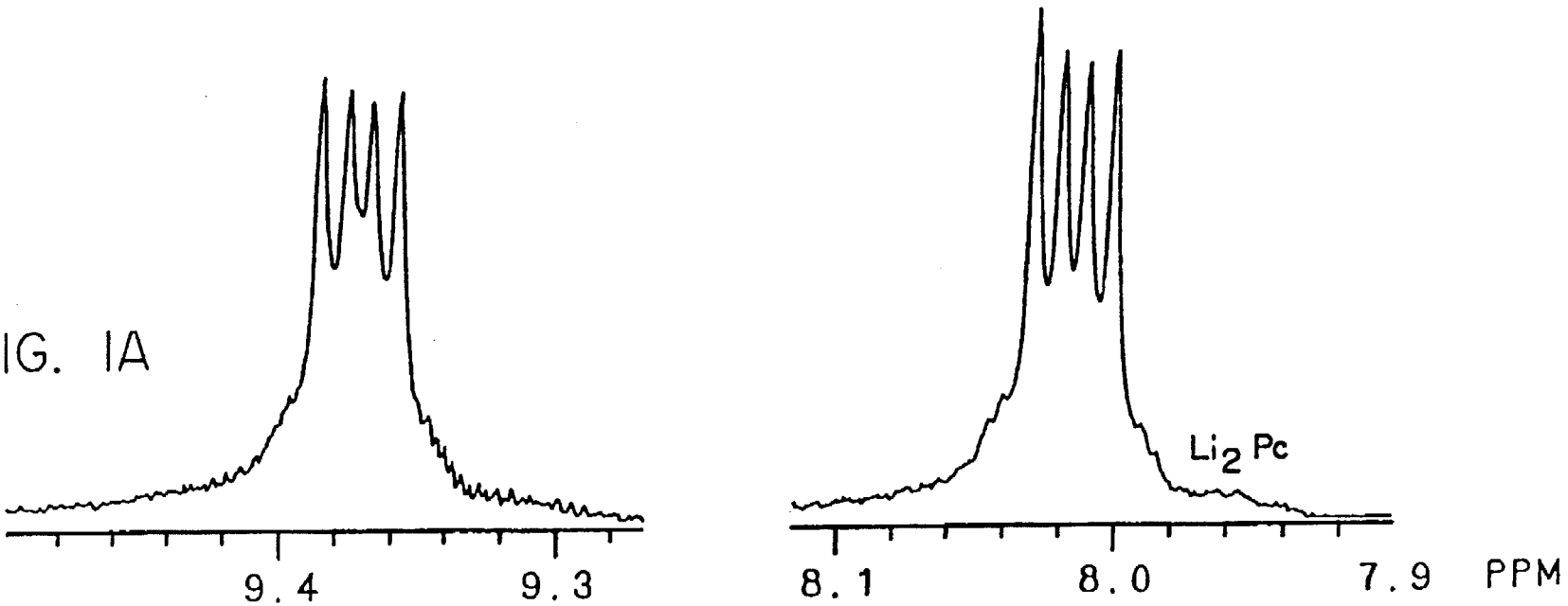
FIGS. 1A and 1B includes proton ($^1H$) NMR (nuclear magnetic resonance) spectra of (a) di-lithiated phthalocyanine ($Li_2Pc$) and (b) deuterated $Li_2Pc$ in perdeuterated acetone ($d^6$-acetone) showing that the nonperipheral carbon positions of the phthalocyanine are substituted.

The phthalocyanines and their metal complexes are notoriously insoluble in organic solvents. Therefore, the use of these compounds in solution chemistry applications is limited. Accordingly, the method of the present invention provides phthalocyanine compounds and metallophthalocyanine compounds that exhibit an increased solubility in organic media. The increased solubility exhibited by these compounds should increase the use of phthalocyanine compounds in practical applications. Surprisingly and unexpectedly, the method of the present invention provides soluble phthalocyanines and metallophthalocyanines in a one-step process that avoids the laborious and lengthy processes utilized in the prior art involving multistep synthetic schemes utilizing phthalocyanine precursors.

Previous investigators have synthesized substituted phthalocyanines that are soluble in common organic solvents. However, the previous investigators utilized synthetic schemes involving a labor intensive, multi-step process, including the synthesis of phthalocyanine precursors, such as substituted phthalonitriles and substituted phthalimides. These substituted phthalocyanine precursors then are condensed to form either phthalocyanines or metalated phthalocyanines that exhibited solubility in organic media.

Surprisingly and unexpectedly, the method of the present invention provides phthalocyanines and metalated phthalocyanines that are soluble in organic media by a one-step process that positions at least one, and up to four, trialkylsilyl moieties on the nonperipheral carbon positions of the phthalocyanine compound. These trialkylsilyl-substituted phthalocyanine compounds demonstrate sufficient solubility in organic media, and sufficient stability, such that the phthalocyanine compounds can be used in solution chemistry applications, such as a homogeneous catalyst.

In particular, the method utilizes a sterically-hindered metalation reagent, like an active metal amide, such as lithium 2,2,6,6-tetramethylpiperidide, in the presence of an electrophilic reagent that includes the substituent moiety to be incorporated onto the phthalocyanine compound. The substituent moiety, such as the trimethylsilyl substituent moiety derived from the electrophilic reagent chlorotrimethylsilane, is positioned on a nonperipheral carbon position of the phthalocyanine in a one-step procedure. T. D. Krizan, et al., in the publication "In Situ Trapping of Ortho-Lithiated Benzenes Containing Electrophilic Directing Groups", *J. Am. Chem. Soc.*, 105, pp. 6155–6157 (1983), reported the substitution of phenyl protons using lithium 2,2,6,6-tetramethylpiperidide and chlorotrimethylsilane. The method of the present invention provides high yields of the soluble phthalocyanine substituted with at least one trialkylsilyl moiety.

As will be demonstrated more fully hereinafter, using a sterically-hindered metalation reagent essentially eliminates an interaction between the sterically-hindered metalation reagent and the electrophilic reagent before the metalation reagent metalates the phthalocyanine. Accordingly, the phthalocyanine can be substituted in a one-step procedure by including the phthalocyanine, the metalation reagent and the electrophile reagent in a single reaction mixture. Furthermore, as an added advantage, because the electrophilic reagent initially is present in the reaction mixture, the electrophilic reagent is available to immediately interact with the relatively unstable metalated phthalocyanine, like dilithiated phthalocyanine, and trap the metalated phthalocyanine before extensive side reactions can occur. Eliminating the side reactions not only increases the yield of the soluble, substituted phthalocyanine, but also reduces or eliminates the production of unwanted and interfering reaction by-products. For example, a high yield of trimethylsilylated zinc phthalocyanine was obtained in a one-step procedure by interacting the chlorotrimethylsilane, zinc phthalocyanine and lithium 2,2,6,6-tetramethylpiperide in a single reaction mixture.

To demonstrate the new and unexpected results achieved by the method of the present invention, the metalation reagent lithium 2,2,6,6-tetramethylpiperidide (Li-TMP, 7.8 mmol) was added to a solution of 29H,31H-phthalocyanine ($H_2Pc$, 1.0 mmol) and the electrophilic reagent chlorotrimethylsilane ($Me_3SiCl$, 8.7 mmol) in tetrahydrofuran at −78° C. Tetrahydrofuran is an inert solvent with respect to the essential ingredients. In general, any inert organic solvent can be used, including, but not limited to, diethyl ether, hexane, benzene and toluene.

The resulting solution was allowed to slowly warm to ambient temperature over a period of about 2 hours, yielding a mixture of trimethylsilyl-substituted phthalocyanines, $H_2Pc(SiMe_3)_x$, wherein x is a number from 1 to 4. The product mixture was separated via column chromatography giving isolated yields of 13%, 18% and 3% of $H_2Pc(SiMe_3)_x$ for x=4, 3 and 2, respectively. It was observed that no compound having the formula $H_2Pc(SiMe_3)_x$ with x greater than 4 was obtained even for a reaction mixture having a ratio of molar amount of Li-TMP to molar amount of $H_2Pc$ of about 32. However, with this ratio of reagents, the yield of $H_2Pc(SiMe_3)_x$, wherein x equals 4, was increased.

In this particular reaction, the sterically-hindered Li-TMP, rather than interacting directly with the $Me_3SiCl$, ortho-lithiated $H_2Pc$. This lithiated phthalocyanine is then trapped by $Me_3SiCl$ to provide the trimethylsilyl-substituted phthalocyanines, $H_2Pc(SiMe_3)_x$, wherein x is a number ranging from 1 to about 4. The mixture of trimethylsilyl-substituted phthalatecyanines provided by the above reaction demonstrated an excellent solubility in nonpolar organic solvents. For example, the solubility of the reaction products, $H_2Pc(SiMe_3)_x$, wherein x is a number from 2 to 4, is 0.07 M at 25° C. in methylene chloride.

In addition to lithium amides, other active metal amides, like sodium, magnesium or potassium amides also can be used in the method of the present invention. However, to achieve the full advantage of the present invention, a lithium amide is used as the metalating reagent. Also, as the metalating reagent should be sterically-hindered in addition to the active metal 2,2,6,6-tetramethylpiperidide, examples of other sterically-hindered amines that can be used include, but are not limited to, lithium diisopropylamide.

To demonstrate that the nonperipheral carbon positions of phthalocyanine are trimethylsilyl-substituted, as opposed to the peripheral carbon positions, a proton ($^1B$) NMR (nuclear magnetic resonance) spectrum of the aromatic protons of the compound $H_2Pc(SiMe_3)_x$, wherein x is 4, was obtained. The $^1H$ NMR spectra of the aromatic protons of $H_2Pc(SiMe_3)_4$ shows that only about half as many nonperipheral protons having a chemical shift of δ=9.4–9.7 ppm are present as the peripheral protons having a chemical shift of δ=8.1–8.5 ppm. The NMR spectrum therefore shows that the lithiation and the silylation are directed essentially entirely to the non-peripheral carbon positions of $H_2Pc$.

Figure 1B:
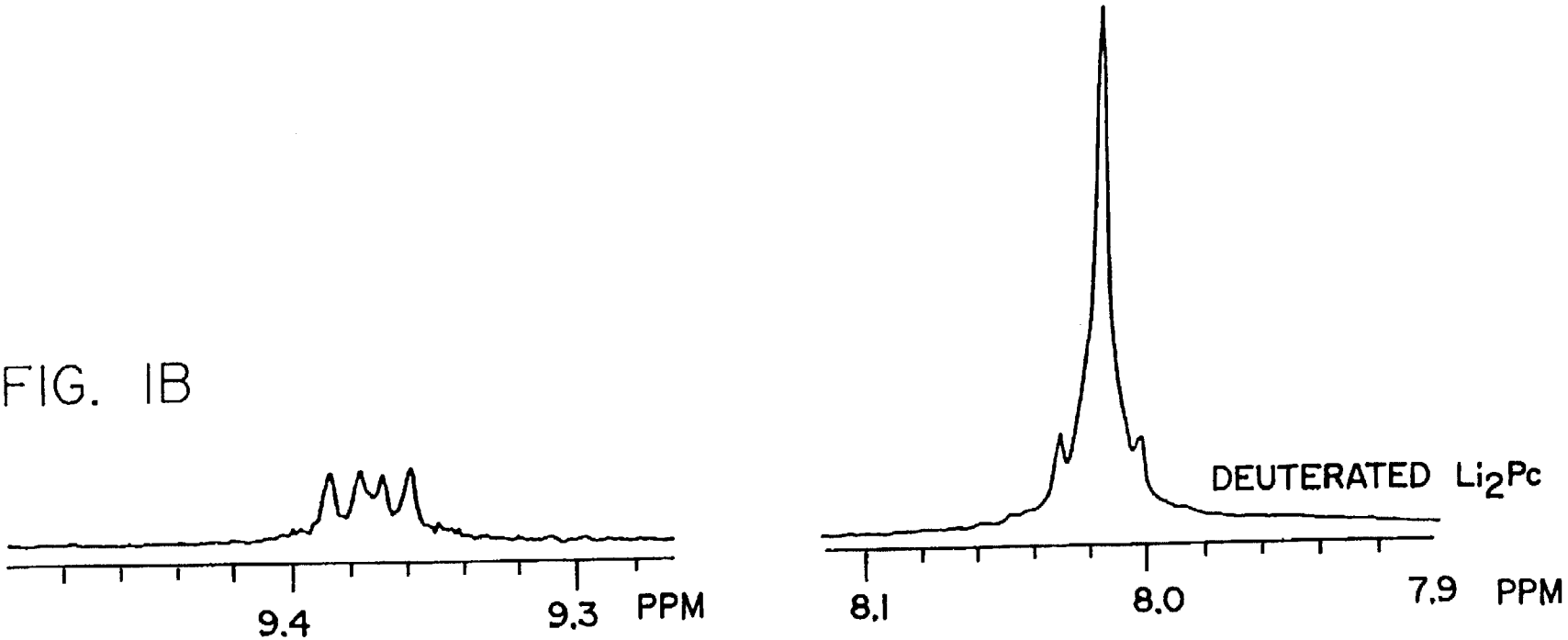

In further support of this observation, a lithium tetramethylpiperidide catalyzed hydrogen-deuterium exchange reaction, conducted at −23° C., between dilithiated phthalocyanine ($Li_2Pc$) and 1-$d^1$-2,2,6,6-tetramethylpiperidine (i.e., 2,2,6,6-tetramethylpiperidine deuterated at the one, or nitrogen position), leads to selective replacement of the hydrogen atoms on the carbons at the nonperipheral positions, as shown in equation (1). Accordingly, the $^1H$ NMR spectra of the deuterated dilithiated phthalocyanine (FIG. 1) exhibits a singlet at δ=8.02 ppm for the peripheral protons, because their spin-spin couplings to the non-peripheral protons vanish. In addition, the multiplet at δ=9.38 ppm for the residual non-peripheral protons is relatively weak. Furthermore, the $^2H$ NMR spectra of the deuterated $Li_2Pc$ exhibits a strong singlet at δ=9.38 ppm for the non-peripheral deuterium atoms while the expected singlet at δ=8.02 ppm for the peripheral deuteriums is barely discernible. It also was observed that for reaction performed at higher reaction temperatures, the degree of selective substitution at the nonperipheral carbon positions is decreased. Accordingly, the essential ingredients of the present invention, i.e., the phthalocyanine, the metalation reagent and the electrophilic reagent are admixed at temperatures below about −20° C. to ensure that the phthalocyanine is selectively substituted at the nonperipheral carbon positions.

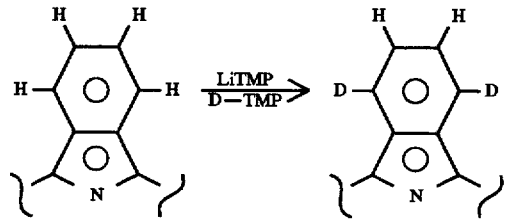

(1)

Figure 2:
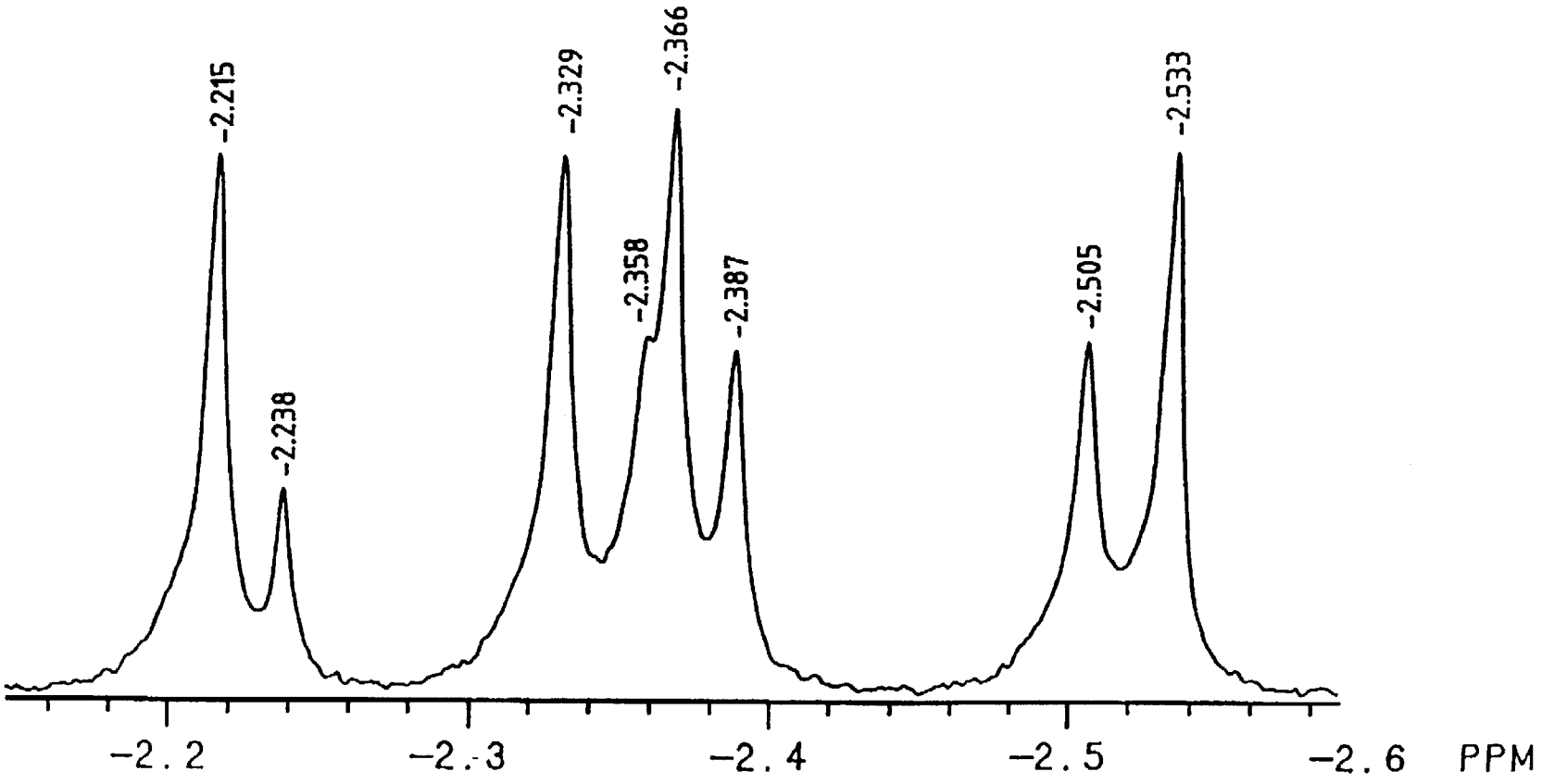
FIG. 2 is a silicon [$^{29}Si(^1H)$] NMR spectrum of a trimethylsilyl-substituted phthalocyanine of the present invention, $H_2Pc(SiMe_3)_4$, taken at 60 MHz (megahertz) in deuterated chloroform ($CDDl_3$).

The observation that all eight nonperipheral protons of $Li_2Pc$ are replaced in the hydrogen-deuterium exchange reaction, whereas only a maximum of four trimethylsilyl moieties are substituted at these nonperipheral positions, indicates that only one trimethylsilyl moiety can occupy each of the four pockets between two adjacent isoindole moieties. Theoretically, this observation is a result of the bulkiness of the trimethylsilyl moiety. In accordance with this steric constraint, four isomers for the substituted phthalocyanine, $H_2Pc(SiMe_3)_4$, having a statistical distribution of 1:1:2:4, are possible. Accordingly, an isomeric mixture having this statistical distribution would demonstrate eight $^{29}Si$ (silicon-29) nuclear magnetic resonances of equal intensities for the eight magnetically distinct $SiMe_3$ groups. Consistent with this distribution, the $^{29}Si$ NMR spectrum of $H_2Pc(SiMe_3)_4$ in FIG. 2 shows eight resonances at a chemical shift (E value) of between −2.215 and −2.533 ppm, in reference to tetramethylsilane (TMS) in deuterated chloroform ($CDCl_3$) at δ=0. This distribution of isomers approximates the expected statistical distribution within a factor of 3. For the purpose of comparison, one of the four isomers, 1,8,15,22-tetrakis(trimethylsilyl)phthalocyanine, was prepared by a more laborious, multistep prior art synthetic route. This isomer exhibits a single $^{29}Si$ NMR resonance at δ=−2.366 ppm.

Accordingly, it has been found that the carbons at the nonperipheral positions in a phthalocyanine can be efficiently and selectively metalated. Therefore, because of the extreme versatility of lithium and magnesium metalating reagents, it is possible to incorporate a variety of substituents into a phthalocyanine to increase the solubility of the phthalocyanine. The method of the present invention utilizes a sterically-hindered metalation reagent, like lithium 2,2,6,6-tetramethylpiperidide, in the presence of an electrophilic reagent derived from the substituent to be incorporated into the phthalocyanine. For example, the electrophilic reagent chlorotrimethylsilane is used to incorporate a trimethylsilyl substituent onto a phthalocyanine. Surprisingly and unexpectedly, the yield of substituted phthalocyanines from the one-step procedure of the present invention is relatively high. In general, using a sterically-hindered metalation reagent precludes attack on the electrophilic reagent by the metalation reagent. Therefore, the electrophilic reagent can be present in the reaction mixture during the metalation of the phthalocyanine by the sterically-hindered metalation reagent. Accordingly, with the electrophilic reagent present, the unstable metalated phthalocyanines are trapped essentially immediately by the electrophilic reagent before extensive side reactions can occur. Consequently, a relatively high yield of about 40% of trimethylsilylated ZnPc including from one to four trimethylsilyl substituents was obtained in a one-step procedure utilizing chlorotrimethylsilane as the electrophilic reagent and zinc phthalocyanine (ZnPc) as the substrate. It further has been found that using $Li_2Pc$ as the substrate, 1-deuterotetramethylpiperidine as the electrophilic reagent, and lithium 2,2,6,6-tetramethylpiperidide as the metalation reagent, the metalation occurs with sterospecific substitution at the nonperipheral carbon positions of the phthalocyanines. Examples of other sterically-hindered metalation reagents that can be used in the method of the present invention include, but are not limited to, lithium diisopropylamide.

The increased solubility of the substituted phthalocyanines and substituted metallophthalocyanines of the present invention allows these substituted phthalocyanine compounds to be used as catalysts, in solution, at high temperatures and pressures. Furthermore, in contrast to the prior art, the substituted phthalocyanines are easily prepared in high yields via a one-step synthetic scheme.

Therefore, the present invention provides a one-step synthetic scheme to convert a phthalocyanine, or a metal complex of a phthalocyanine, well-known for their low solubility in organic solvents, to trialkylsilyl-substituted phthalocyanines having an improved solubility in organic solvents. The synthetic scheme includes reacting a phthalocyanine with a sterically-hindered metalation reagent, like lithium 2,2,6,6-tetramethylpiperidide or a similar sterically-hindered lithium amide, in the presence of an excess amount of a halotrialkylsilane, like chlorotrimethylsilane. Examples of other halotrialkylsilanes that can be used in the method of the present invention include, but are not limited to, trimethylsilyl bromide and triethylsilyl chloride.

Although other investigators have synthesized substituted phthalocyanines that are soluble in organic solvents, each prior art synthetic scheme involved a multistep preparation of phthalocyanine precursors, such as phthalonitriles and phthalimides, that then are condensed to form a phthalocyanine. Therefore, the method of the present invention has the advantages of utilizing readily-available phthalocyanines, providing a one-step synthesis with a yield of phthalocyanines that are soluble in organic media as high as about 40%; and the ability to solubilize preformed phthalocyanine compounds, such as phthalocyanine monomers, dimers or polymers, in organic media.

It should be understood that the present disclosure has been made only by way of preferred embodiment and that numerous changes in details of construction, combination, and arrangement of parts can be resorted to without departing from the spirit and scope of the invention as hereunder claimed.

The embodiment of the invention in which an exclusive property or privilege is claimed is defined as follows:

1. A phthalocyanine compound exhibiting solubility in organic media and having the formula:

$$MPc\ (SiR'R''R''')_x$$

wherein Pc is phthalocyanine; M is a metal ion selected from the group consisting of zinc, copper, iron, cobalt, nickel, rhodium and ruthenium; R' is methyl, R" is ethyl, and R'" is isopropyl; x is a numeral ranging from one to four; and the SiR'R"R'" substituent is present on the phthalocyanine compound at one or more of the nonperipheral carbon positions of the phthalocyanine compound numbered 1, 4, 8, 11, 15, 18, 22, and 25.

2. The compound of claim 1 wherein x is the numeral 2, the numeral 3, or the numeral 4.

* * * * *